United States Patent Office 2,848,398
Patented Aug. 19, 1958

2,848,398

RECOVERY OF GALLIUM COMPOUNDS FROM THE COMBUSTION GASES OF COAL

Masaru Inagaki, Tokyo, Japan, assignor to Zaidan Hojin Sekitan Sogo Kenkyujo, Tokyo, Japan No Drawing. Application May 1, 1956
Serial No. 581,831

Claims priority, application Japan May 11, 1955

2 Claims. (Cl. 204—105)

This invention relates to the recovery of gallium compounds from the combustion gases of coal. More particularly, the invention relates to the removal of gallium compounds from such gases by washing the gases with a water, as is preferred, or an alkaline aqueous solution, or an acidic aqueous solution, to dissolve the compounds, forming a gallium-containing precipitate by treatment with a tannin in the resulting enriched liquor, and isolating gallium compounds and/or gallium metal from the precipitate.

Generally, coals may contain from about 0.01 to about 30 p. p. m. of gallium.

It has been found that when gallium-containing coals are burned, gallium compounds appear in the combustion gases, probably in the form of its lower oxides or sulfides which are very volatile above 700° C.

The inventor has found that when the combustion gases of coal are washed and cooled with a water or an alkaline aqueous solution such as a solution of ammonia, sodium hydroxide, sodium bicarbonate, etc., or an acidic aqueous solution such as a solution of sulfuric acid, hydrochloric acid, etc., the gallium compounds in the gases are dissolved in the washing, cooling solution.

When said aqueous wash liquor is treated with a tannin, the gallium is co-precipitated in the form of tannin-gallium adsorption compounds and tannin-iron adsorption compounds.

The said precipitate is dried and then burned to produce an ash containing oxides of gallium and germanium.

The ash is chlorinated in a conventional manner to convert the oxides of gallium and germanium to the chlorides.

Preferably the chlorination is carried out by mixing the ash with concentrated hydrochloric acid and then distilling, a distillate fraction containing germanium tetrachloride being removed while gallium trichloride remains in solution in the still.

This residual solution is then subjected to filtration, or filtration and reduction, to remove impurities, the solution is extracted with an ether for gallium trichloride, and the extract, after removal of the ether, is treated to precipitate gallium hydroxide. The gallium hydroxide is removed by filtration and may be recovered as such, or subjected to further purification, or dissolved in sodium hydroxide solution to form sodium gallate and this solution electrolyzed to deposit out gallium metal.

The following example may be held to illustrate the invention.

*Example*

Five hundred tons of Jyoban coal in Japan were subjected to combustion at a temperature over 800° C. for a period of about 24 hours. Combustion gas, totaling about 5,000,000 cubic meters, was taken from the flue at a point near the furnace where the gas temperature was about 200–300° C.

The gas was washed and cooled by a liquor comprising 0.1% caustic soda solution. This liquor was recirculated through the washer. The enriched liquor containing insoluble materials, was filtered and then mixed with 30 kg. of a tannin. The tannin-gallium, tannin-iron, tannin-germanium co-precipitate was filtered and dried, a total 18 kg. of moisture-free material being obtained. The dried precipitate was roasted with air at a temperature of less than 400° C. in a furnace. The roasted ash, totaling about 1.4 kg., was mixed with about 4.2 liters of 31% hydrochloric acid solution and distilled.

Germanium tetrachloride was hydrolyzed with water to produce a precipitate of germanium dioxide.

The residual solution containing gallium trichloride was reduced with aluminum, powdered and cooled, filtered, and then subjected to extraction with ether.

The gallium trichloride was transferred to the ether layer.

The ether solution of gallium trichloride was mixed with half of its volume of 2% hydrochloric acid, and the ether recovered by distillation. The aqueous gallium trichloride solution remaining after distilling off the ether was cooled, filtered, and treated with ammonium hydroxide solution to adjust its pH to a value of about 3.0. A precipitate of gallium hydroxide was obtained which was filtered out and dissolved in aqueous sodium hydroxide to form sodium gallate solution.

This was electrolyzed at 6 volts using a platinum sheet electrode, and about 30 grams of gallium were recovered.

I claim:

1. The method of recovering gallium compounds from hot combustion gases containing trace amounts of germanium and gallium which comprises washing and cooling the gases with an aqueous solution to obtain an enriched washed liquor, adding a tannin to produce a gallium and germanium containing precipitate, drying and burning the precipitate to produce an ash containing oxides of gallium and germanium, chlorinating the ash to convert the oxides to germanium tetrachloride and gallium trichloride, hydrolizing the germanium tetrachloride to produce a precipitate of germanium dioxide leaving a residual solution containing gallium trichloride, subjecting the residual solution to filtration and reduction to remove the impurities, extracting the solution with an ether for gallium trichloride, mixing the ether solution of gallium trichloride with hydrochloric acid and recovering the ether by distillation to leave an aqueous gallium trichloride solution, treating said solution with an ammonium hydroxide solution to obtain a precipitate of gallium hydroxide, filtering this precipitate and dissolving the same in aqueous sodium hydroxide to form a sodium gallate solution, and subjecting this sodium gallate solution to electrolysis to recover the gallium in the solution.

2. The method of recovering gallium compounds from hot combustion gases containing trace amounts of germanium and gallium which comprises washing and cooling the gases with an alkaline solution to obtain an enriched washed liquor, adding a tannin to produce a gallium and germanium containing precipitate, drying and burning the precipitate to produce an ash containing oxides of gallium and germanium, chlorinating the ash to convert the oxides to germanium tetrachloride and gallium trichloride, hydrolizing the germanium tetrachloride to produce a precipitate of germanium dioxide leaving a residual solution containing gallium trichloride, subjecting the residual solution to filtration and reduction to remove the impurities, extracting the solution with an ether for gallium trichloride, mixing the ether solution of gallium trichloride with hydrochloric acid and recovering the ether by distillation to leave an aqueous gallium trichloride solution, treating said solution with an ammonium hydroxide solution to obtain a precipitate of gallium hydroxide, filtering this precipitate and dissolving the same in aqueous sodium hydroxide to form a sodium gallate solution, and subjecting this sodium gallate solution to electrolysis to recover the gallium in solution.

References Cited in the file of this patent

UNITED STATES PATENTS

| | | |
|---|---|---|
| 2,249,341 | Zischkau | July 15, 1941 |
| 2,582,376 | Frary | Jan. 15, 1952 |

OTHER REFERENCES

Lever: "Metal Industry," January 4, 1952, pp. 3–4.